US008111974B2

(12) United States Patent
Bansal et al.

(10) Patent No.: US 8,111,974 B2
(45) Date of Patent: Feb. 7, 2012

(54) ENABLING COMPLETE VIEWING CONTENT FOR SELECTED PROGRAMMING

(75) Inventors: Ravi Prakash Bansal, Tampa, FL (US); Rick Allen Hamilton, II, Charlottesville, VA (US); Brian Marshall O'Connell, Cary, NC (US); James Wesley Seaman, Falls Church, VA (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 11/877,725

(22) Filed: Oct. 24, 2007

(65) Prior Publication Data

US 2009/0113486 A1 Apr. 30, 2009

(51) Int. Cl.
*H04N 5/76* (2006.01)

(52) U.S. Cl. ........................................................ 386/298

(58) Field of Classification Search .................. 386/200, 386/241, 229, 332, 298
See application file for complete search history.

(56) References Cited

U.S. PATENT DOCUMENTS

| | | | | |
|---|---|---|---|---|
| 4,982,390 | A * | 1/1991 | Tanaka | 369/83 |
| 6,148,140 | A * | 11/2000 | Okada et al. | 386/241 |
| 6,816,578 | B1 | 11/2004 | Kredo et al. | |
| 6,957,077 | B2 | 10/2005 | Dehlin | |
| 7,065,185 | B1 | 6/2006 | Koch | |
| 2004/0121785 | A1 | 6/2004 | Vance, Jr. et al. | |
| 2008/0086743 | A1 * | 4/2008 | Cheng et al. | 725/38 |

* cited by examiner

*Primary Examiner* — Huy T Nguyen
(74) *Attorney, Agent, or Firm* — Yee and Associates, P.C.; Mark C. Vallone

(57) ABSTRACT

Enabling complete viewing of selected programming content is provided. In response to receiving an input data stream from a programming service provider, the input data stream is stored in a supplemental storage. In response to a user selecting a programming channel after a program starts to air, the input data stream is stored in a programming storage. Then, the stored data stream is outputted from the supplemental storage to a viewing device.

18 Claims, 4 Drawing Sheets

ENABLING COMPLETE VIEWING CONTENT FOR SELECTED PROGRAMMING

BACKGROUND OF THE INVENTION

1. Field of the Invention

The present invention relates generally to an improved data processing system. More specifically, the present invention is directed to a computer implemented method, system, and computer usable program code for enabling complete viewing of content for selected programming.

2. Description of the Related Art

Today, most cable, satellite, and fiber optic television service providers have the ability to offer several hundred channels of programming for a user to select from. A recent study of television viewing in the United States and Canada indicates that 87% of households subscribe to a programming service, such as a cable, satellite, or fiber optic television programming service, and that the average household receives approximately 100 channels of programming. As a result, when a program finishes, only a limited amount of time exists for the viewer to enable the online channel guide, review all the available program channels, and then select a desired program for viewing without missing the beginning of the selected program. This is particularly troublesome when the viewer selects one of the many popular law or medical dramas where the initial few minutes of the show are critical to the entire plot and the remainder of the show.

One possible solution to this problem is for a subscribing household to receive this vast amount of television programming through a digital video recorder (DVR), such as, for example, TiVo®. A DVR is a device that records video data in a digital format to a disk drive or other storage medium and then plays back the recorded video data from the disk drive to a television. However, in current DVRs, the inbound data stream from the programming service provider is fed into a tuner or a set of tuners. Based on the channel selected on each tuner within the DVR, a subset of the data stream corresponding to the selected channel is stored on the DVR and/or displayed on a television as a program. The rest of the data stream is ignored.

Presently, a DVR cannot record more channels than the number of tuners installed within the DVR. Typically, tuners are bulky by modern electronics standards and are relatively expensive. In addition, if a viewer is watching channel 001 on a television using a current DVR and browsed the on-screen television guide before finally selecting channel 100 to watch, any portion of the program on channel 100 that has already aired cannot be retrieved by a current DVR because the program is viewed through the tuner as a live data stream.

Furthermore, many channels do not start and end programs on the hour or half hour. For example, a viewer may be watching a program that ends at 12:05 p.m. on one channel, but the viewer may also want to watch a program that starts at 12:00 p.m. on another channel. Consequently, the viewer must choose to miss either the last five minutes of one program or the first five minutes of the other program. If the viewer chooses to miss the beginning of the other program, there is no way for the viewer to retrieve the content of the program that was missed.

Therefore, it would be beneficial to have a computer implemented method, system, and computer usable program code for enhancing DVR functionality so that the beginning of each live program is available for some period of time after the program starts to air.

SUMMARY OF THE INVENTION

Illustrative embodiments provide a computer implemented method, system, and computer usable program code for enabling complete viewing of selected programming content. In response to receiving an input data stream from a programming service provider, the input data stream is stored in a supplemental storage. In response to a user selecting a programming channel after a program starts to air, the input data stream is stored in a programming storage. Then, the stored data stream is outputted from the supplemental storage to a viewing device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
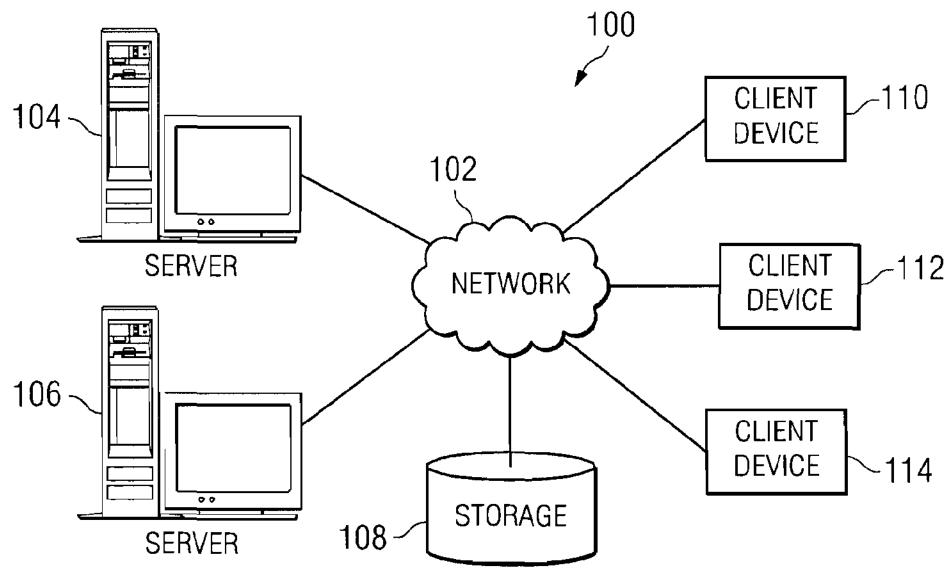
FIG. 1 is a pictorial representation of a network of data processing systems in which illustrative embodiments may be implemented.
Figure 2:
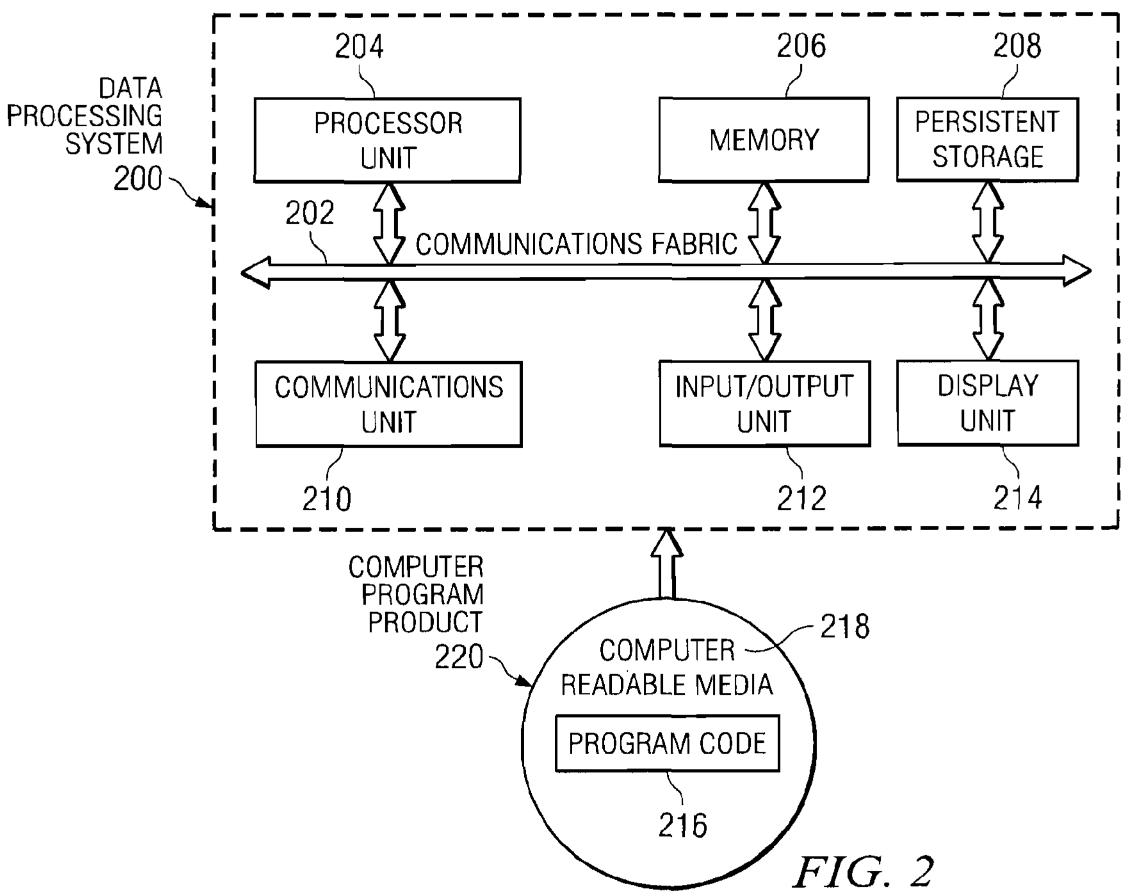
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers, DVRs, and other devices, in which the illustrative embodiments may be implemented. Network data processing system 100 contains network 102, which is the medium used to provide communications links between the various devices connected together within network data processing system 100. Network 102 may include connections, such as wire, wireless communication links, or fiber optic cables.

In the depicted example, server 104 and server 106 connect to network 102 along with storage unit 108. Server 104 and server 106 represent television programming service providers, such as cable, satellite, internet protocol, and fiber optic television programming service providers. In addition, server 104 and server 106 may represent a network of computers and other devices required by the service providers in order to provide the television programming service.

Storage 108 represents any type of storage device that is capable of storing data in a structured or unstructured format. Also, storage 108 may represent a plurality of storage units coupled to network 102. Storage 108 may, for example, be a database that stores customer data and/or television programming data for a television programming service provider.

Further, client devices 110, 112, and 114 also connect to network 102. Client devices 110, 112, and 114 may be, for example, personal computers, DVRs, or a combination thereof. Client devices 110, 112, and 114 are clients to server 104 and/or server 106 in this example. Server 104 and server 106 provide data streams containing television programming content to client devices 110, 112, and 114. Furthermore, server 104 and server 106 may provide other data, such as boot files, operating system images, and applications to client devices 110, 112, and 114. Moreover, network data processing system 100 may include additional servers, clients, and other devices not shown.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a computer or a DVR, such as server 104 or client device 110 in FIG. 1, in which computer usable program code or instructions implementing the processes of the illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a disk drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

Communications unit 210, in these examples, provides for communications with other data processing systems or devices, such as, for example, server 104 and server 106 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through an alphanumeric keypad. Display unit 214 provides a mechanism to display information to a user of data processing system 200.

Instructions for the operating system and applications or programs are located on persistent storage 208. The operating system may, for example, be a Linux® operating system. An application may, for example, be DVR software that includes programming selection logic.

The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different illustrative embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for enabling complete viewing of selected programming content.

In response to receiving an input data stream from a programming service provider, a DVR stores the input data stream in a supplemental storage. Then, in response to a user selecting a programming channel after a program starts to air, the DVR stores the input data stream in a programming storage. In addition, the DVR outputs the stored data stream from the supplemental storage to a viewing device.

Further, the DVR determines whether the entire missed portion of the selected program was outputted from the supplemental storage. If the entire missed portion of the selected program was outputted from the supplemental storage, then the DVR switches the output from the supplemental storage to the programming storage. Moreover, in response to switching the output from the supplemental storage to the programming storage, the DVR purges the stored data stream from the supplemental storage or marks the stored data stream as obsolete and overwrites the stored data stream as needed.

Thus, illustrative embodiments provide enhanced DVR functionality so that when surfing channels to find programming to watch, a viewer does not miss the beginning of the ultimately selected program. Illustrative embodiments accomplish this task by temporarily storing inbound programming data streams on a supplemental storage device or subsystem so that the beginning of a plurality of programs are available for viewing on a viewing device, such as a television or computer, for some period of time after the live program has begun to play.

A DVR may record programming anywhere from 30 hours to 320 hours depending upon recording quality. It should be noted that a DVR may record programs at varying levels of quality. The amount of storage space that a program consumes, for example, on a disk drive, depends both on the length of time the program is recorded and the quality of the recording.

Typically, a DVR may use one of three quality settings for recording programs. The first setting is long play (LP), which stores the input data stream as a highly compressed MPEG-1 file. The second setting is standard play (SP), which stores the input data stream as a moderately compressed MPEG-2 file. Finally, the third setting is high quality (HQ), which stores the input data stream as a high quality MPEG-2 file.

Using the HQ setting, the DVR may record a one-hour program on approximately 3.35 gigabytes of storage space. Using the SP setting, the DVR may record the same one-hour program on about 1.7 gigabytes of storage space. Using the LP setting, the DVR may record the one-hour program on only 0.6 gigabytes of storage space. In other words, the DVR may utilize approximately 60 gigabytes of storage space to store about 18 hours of programming using the HQ setting, about 36 hours of programming using the SP setting, and about 100 hours of programming using the LP setting.

However, in terms of quality, the LP setting produces a noticeable grainy appearance to the video, but the video is watchable. The SP setting produces a good quality video to watch, while the HQ setting does not seem to produce a noticeable difference between the SP and HQ settings when viewing a recorded program. Consequently, illustrative embodiments using the SP setting requires on average 0.028 gigabytes of storage space per minute per program recorded. Assuming, for example, a data stream of 100 channels of programming, transfer of only 2.8 gigabytes of data per minute is required to store the entire data stream.

Additionally, an alternative illustrative embodiment may allow a DVR to record and store only select programming channels. As a result, the amount of data transferred and recorded is further reduced. This is a very small amount of required transfer and storage space by today's standards and may be accomplished by using a high speed disk drive, an inexpensive redundant array of independent disks (RAID), a solid state or flash storage device, or a next generation storage device, which historically is smaller, cheaper, and faster than existing storage devices.

In a preferred illustrative embodiment, the DVR stores the incoming data stream to a supplemental storage, which wraps back to overwrite the oldest portion of the stored data stream once the capacity of the supplemental storage is reached. In other words, the supplemental storage uses a first in/first out (FIFO) or a circular buffer technique. As an example, using 40 gigabytes of storage space in supplemental storage, the DVR may record about 14 minutes of the input data stream before overwriting existing stored data in the supplemental storage. Hence, a viewer using an illustrative embodiment may watch a program that began 14 minutes earlier, without missing the beginning portion of the program.

In addition, an illustrative embodiment may simultaneously record the playback of the missed program content from the supplemental storage to the programming storage. As a result, if the viewer decides to keep the program after viewing it, the entire program may be saved in the programming storage. By merging the missed program content stored in the supplemental storage with the remainder of the program content stored in the programming storage, an illustrative embodiment provides the viewer with the ability to save the entire program for future viewing in the programming storage.

In an alternative illustrative embodiment, the viewer may control recording by standard beginning program times, such as, for example, every half hour, or at scheduled program times based on an online program guide. In yet another alternative illustrative embodiment, a programming service provider may host a service that allows a viewer to select favorite viewing channels and then the programming service provider temporarily stores, at its facility and on its own equipment, the beginning portions of these viewer selected favorite channels. Subsequently, the viewer is able to begin a live program by requesting the beginning of the live program from the programming service provider. Thus, illustrative embodiments provide low cost methods to add enhanced features to existing DVRs so that program viewers do not miss the beginning of any programs.

Figure 3:
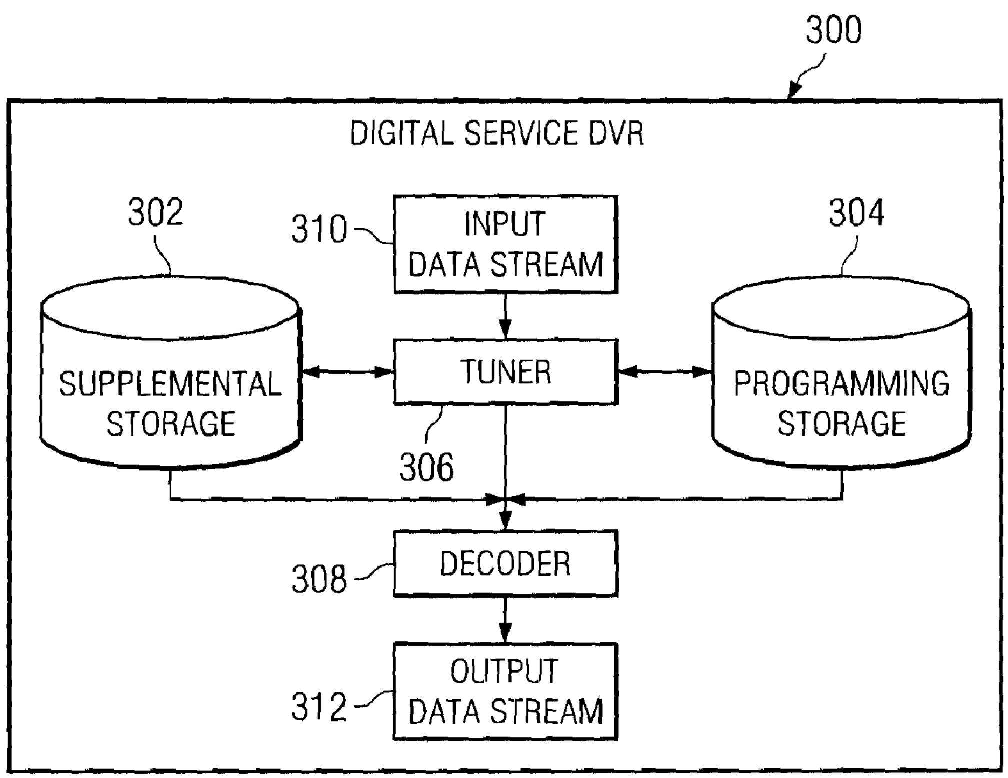
FIG. 3 is an exemplary illustration of a digital service digital video recorder in accordance with an illustrative embodiment.

With reference now to FIG. 3, an exemplary illustration of a digital service DVR is depicted in accordance with an illustrative embodiment. Digital service DVR 300 may, for example, be implemented in data processing system 200 in FIG. 2 and client device 110 in FIG. 1. Digital service DVR 300 is a DVR suitable for receiving digital data streams from, for example, a standard digital cable television service provider.

Digital service DVR 300 includes supplemental storage 302, programming storage 304, tuner 306, and decoder 308. However, it should be noted that digital service DVR 300 is only shown as an example and is not intended as a limitation on illustrative embodiments. In other words, digital service DVR 300 may include more or fewer components as necessary to accomplish processes of illustrative embodiments.

Supplemental storage 302 may be a persistent storage device, such as persistent storage 208 in FIG. 2, or a transient storage device, such as memory 206 in FIG. 2. Supplemental storage 302 may include any type of read/write data store, such as a disk drive, a RAID subsystem, a solid state storage device, a volatile RAM, or any combination thereof. Digital service DVR 300 uses supplemental storage 302 to store initial inbound programming data contained within input data stream 310.

The digital cable television service provider provides input data stream 310 to digital service DVR 300. Input data stream 310 includes programming data for all channels included in a selected subscription agreement package. Input data stream 310 is presented to tuner 306 as usual for viewing, but input data stream 310 is also stored on supplemental storage 302. In addition, it should be noted that tuner 306 may represent one or more tuners within digital service DVR 300.

Programming storage 304 is similar in design and function as supplemental storage 302. However, programming storage 304 is separate from supplemental storage 302 and does not store inbound programming data within input data stream 310 until after a selection logic of digital service DVR 300 starts to output the stored data stream from supplemental storage 302 to a viewing device, such as a television or computer, because the viewer selected a channel where the live program already started to play. After the selection logic of digital service DVR 300 determines that the entire missed portion of the selected program was outputted from supplemental storage 302, the selection logic starts to output the stored data stream to the viewing device from programming storage 304 for the remainder of the selected program or until the viewer changes channels again.

Typically, a digital cable television service broadcast includes four to five standard television MPEG data streams as part of the same multiplex of channels assigned to a broadcast frequency. Once tuner 306 locks onto a channel frequency that carries the currently desired program, the selection logic of illustrative embodiments directs supplemental storage 302 to record the remaining channels that belong to the same multiplex of channels, which are assigned to that same frequency. In addition, digital service DVR 300 may employ a user interface, such as display unit 214 in FIG. 2, to alert the viewer that the channel group's beginning portion is being recorded, while the viewer continues to watch the currently selected program.

The output of supplemental storage 302, programming storage 304, and tuner 306 goes to decoder 308. Digital service DVR 300 uses decoder 308 to decode the digital data streams to produce output data stream 312. Output data stream 312 is in a format suitable for display on the receiving viewing device, such as a television.

Figure 4:
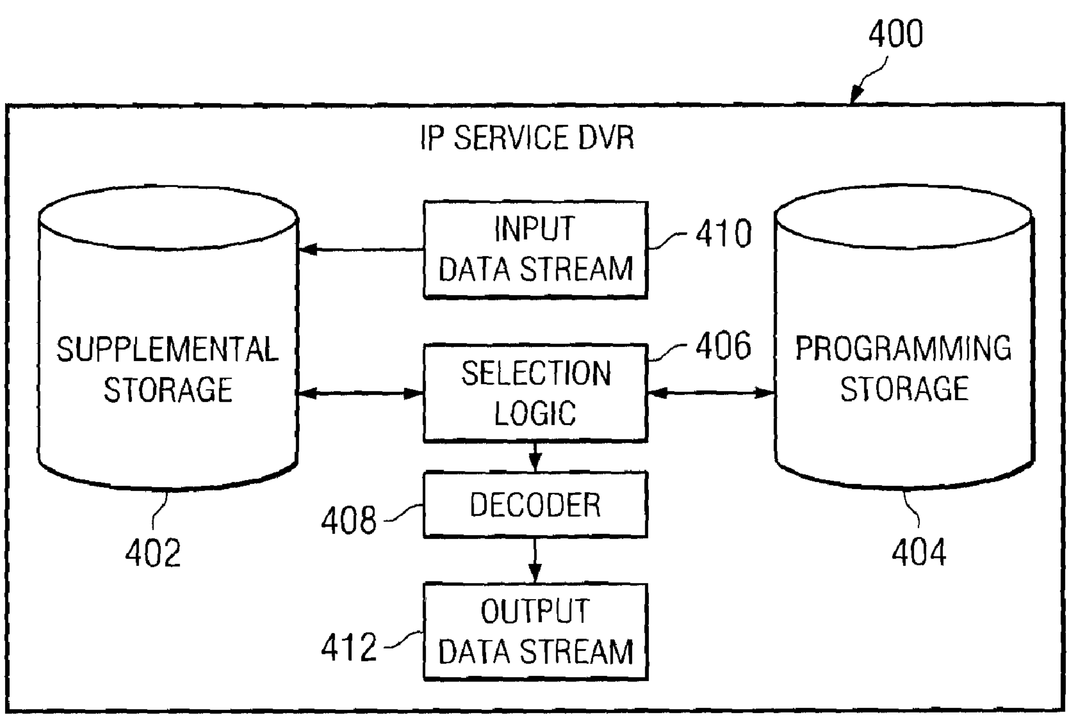
FIG. 4 is an exemplary illustration of an internet protocol service digital video recorder in accordance with an illustrative embodiment.

With reference now to FIG. 4, an exemplary illustration of an internet protocol (IP) service DVR is depicted in accordance with an illustrative embodiment. IP service DVR 400 may, for example, be implemented in data processing system 200 in FIG. 2 and client device 110 in FIG. 1. IP service DVR 400 is similar in design and function to digital service DVR 300 in FIG. 3.

IP service DVR 400 includes supplemental storage 402, programming storage 404, selection logic 406, and decoder 408. However, it should be noted that IP service DVR 400 is only shown as an example and is not intended as a limitation on illustrative embodiments. In other words, IP service DVR 400 may include more or fewer components as necessary to accomplish processes of illustrative embodiments.

IP service DVR 400 is suitable for receiving a broadcast from an IPTV-based service provider network. IP service DVR 400 is capable of recording a plurality of programs on different channels without requiring additional tuners, such as tuner 306 in FIG. 3. In this illustrative example, IP service DVR 400 receives input data stream 410, which is in the form of a plurality of MPEG transmissions sent via a network protocol, such as transmission control protocol/internet protocol (TCP/IP) packets, from the IPTV-based service provider.

Subsequent to IP service DVR 400 receiving input data stream 410, selection logic 406 reconstructs the MPEG transmissions, or the first portion thereof, and stores the reconstructed MPEG transmissions in supplemental storage 402. This process is similar to how a computer system can reconstruct multiple files while simultaneously downloading them. Existing IP based protocols, such as, for example, file transfer protocol (FTP) and secure shell file transfer protocol (SFTP), allow for such simultaneous downloads. Additionally, a myriad of application programs, such as, for example, Torrent101®, provide multiple download capabilities at the application layer. Selection logic 406 is a software component of a DVR application that monitors and controls the different processes of illustrative embodiments.

The output of supplemental storage 402 and programming storage 404 goes to decoder 408. IP service DVR 400 uses decoder 408 to decode the IP data streams to produce output data stream 412. Output data stream 412 is in a format suitable for display on the receiving viewing device, such as a computer.

Figure 5:
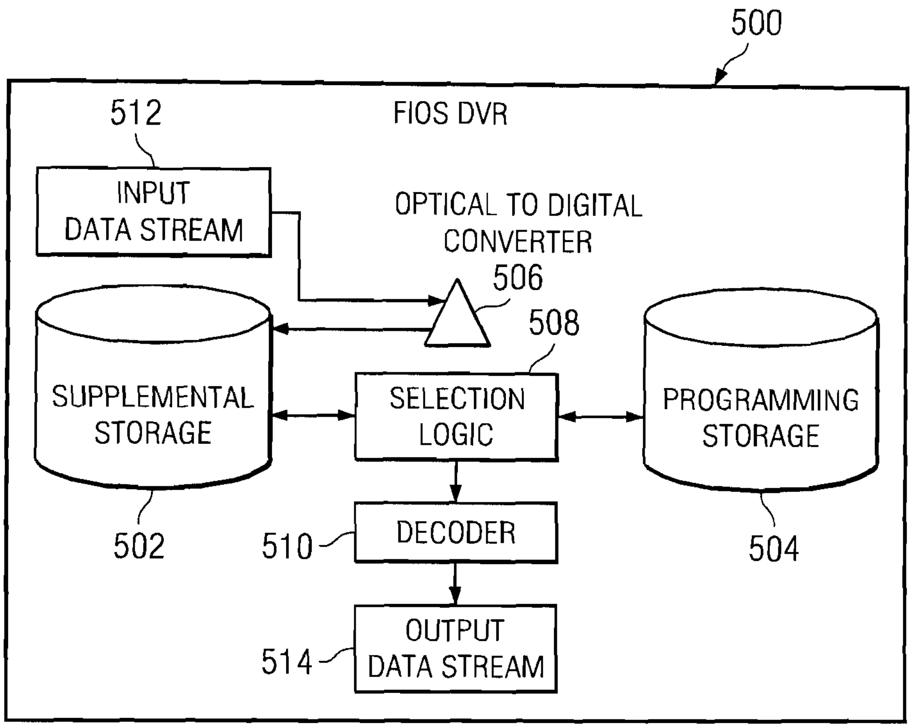
FIG. 5 is an exemplary illustration of a fiber optic service digital video recorder in accordance with an illustrative embodiment.

With reference now to FIG. 5, an exemplary illustration of a fiber optic service (FiOS) DVR is depicted in accordance with an illustrative embodiment. FiOS DVR 500 may, for example, be implemented in data processing system 200 in FIG. 2 and client device 110 in FIG. 1. FiOS DVR 500 is similar in design and function to digital service DVR 300 in FIG. 3 and IP service DVR 400 in FIG. 4.

FiOS DVR 500 includes supplemental storage 502, programming storage 504, optical to digital converter 506, selection logic 508, and decoder 510. However, it should be noted that FiOS DVR 500 is only shown as an example and is not intended as a limitation on illustrative embodiments. In other words, FiOS DVR 500 may include more or fewer components as necessary to accomplish processes of illustrative embodiments.

FiOS DVR 500 is suitable for receiving a broadcast from a FiOS provider network. The FiOS provider sends digital data via optical pulses rather than via radio frequency (RF) signals. Optical to digital converter 506 changes the optical pulses contained within input data stream 512 back into digital data. Rather than converting optical pulses into RF signals that require a tuner to lock onto a frequency, as is currently done today, optical to digital converter 506 changes optical pulses directly into digital data. This conversion process enables FIOS DVR 500 to simultaneously record a plurality of data streams, which are in the form of digital data.

The output of supplemental storage 502 and programming storage 504 goes to decoder 510. FIOS DVR 500 uses decoder 510 to decode the digital data streams to produce output data stream 514. Output data stream 514 is in a format suitable for display on the receiving viewing device.

Figure 6:
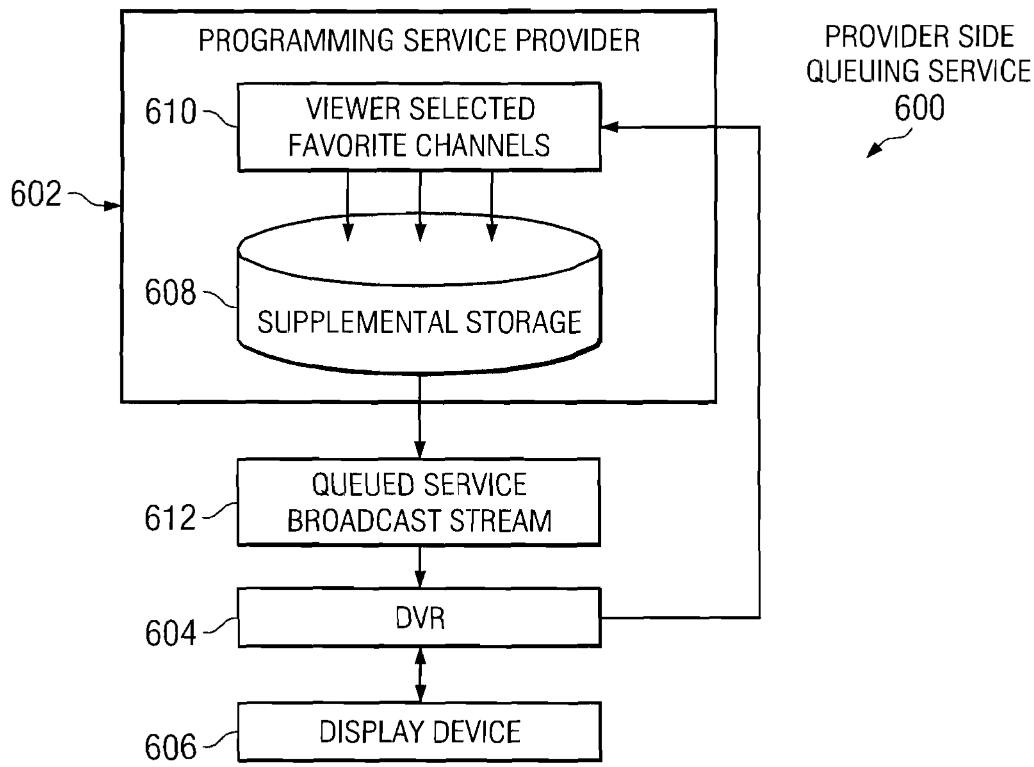
FIG. 6 is an exemplary illustration of a provider side queuing service in accordance with an illustrative embodiment.

With reference now to FIG. 6, an exemplary illustration of a provider side queuing service is depicted in accordance with an illustrative embodiment. Provider side queuing service 600 is a programming service that a programming service provider, such as, for example, a cable, satellite, IP, or FiOS programming service provider, may provide to a subscription customer/viewer. This programming service allows a viewer to select one or more "favorite" channels for storage at the programming service provider. The programming service provider may provide this programming service as a separate fee service per channel selected or as part of a viewer subscription package.

Provider side queuing service 600 includes programming service provider 602, DVR 604, and display device 606. Programming service provider 602 provides and maintains supplemental storage 608. Supplemental storage 608 may, for example, be storage 108 in FIG. 1.

Programming service provider 602 uses supplemental storage 608 to temporarily store the beginning portions of viewer selected favorite channels 610 for a plurality of subscription customers. The viewer may enter viewer selected favorite channels 610 by utilizing, for example, a user input device, such as input/output unit 212 in FIG. 2, on DVR 604. DVR 604 may, for example, be implemented in data processing system 200 in FIG. 2 and client device 110 in FIG. 1. Alternatively, the viewer may enter viewer selected favorite channels 610 by utilizing a user input device on display device 606, which in turn sends the selected favorite channels to DVR 604 for transmission to programming service provider 602. Display device 606 may, for example, be a television, a computer, a personal digital assistant (PDA), a telephone device, or a gaming device.

Programming service provider 602 transmits queued service broadcast stream 612 upon request from the viewer. The viewer may make this request by utilizing either DVR 604 or display device 606. Queued service broadcast stream 612 contains the beginning portions of viewer selected favorite channels 610. As a result, the viewer is now able to begin a live program after requesting the beginning of the live program from programming service provider 602.

Figure 7:
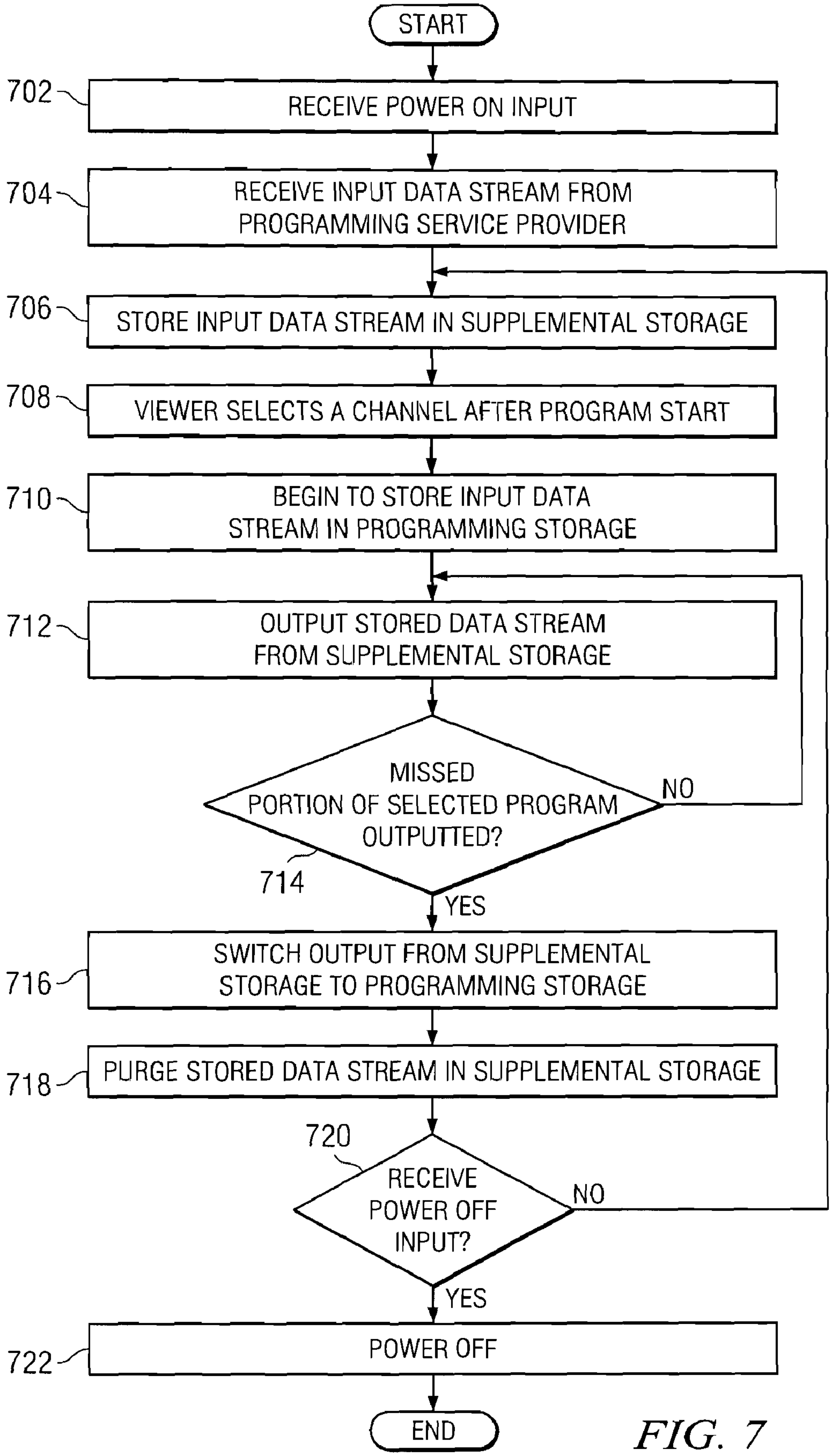
FIG. 7 is a flowchart illustrating an exemplary process for enabling complete viewing of selected programming content in accordance with an illustrative embodiment.

With reference now to FIG. 7, a flowchart illustrating an exemplary process for enabling complete viewing of selected programming content is shown in accordance with an illustrative embodiment. The process shown in FIG. 7 may be implemented in a DVR, such as, for example, digital service DVR 300 in FIG. 3.

The process begins when the DVR receives an input to power on (step 702). After receiving the input to power on in step 702, the DVR receives an input data stream, such as input data stream 310 in FIG. 3, from a programming service provider, such as programming service provider 602 in FIG. 6 (step 704). Then, the DVR stores the input data stream in a supplemental storage, such as supplemental storage 302 in FIG. 3 (step 706).

Subsequently, a viewer selects a channel after a program started to air (step 708). Then, the DVR utilizes a selection logic, such as selection logic 406 in FIG. 4, to begin to store the input data stream in a programming storage, such as programming storage 304 in FIG. 3, (step 710) and to output the stored data stream from the supplemental storage to a display device, such as display device 606 in FIG. 6 (step 712). It should be noted that steps 710 and 712 may occur concurrently.

Afterward, the selection logic makes a determination as to whether the entire missed portion of the selected program was outputted from the supplemental storage (step 714). If the entire missed portion of the selected program has not been outputted from the supplemental storage, no output of step 714, the process returns to step 712 where the selection logic continues to output the stored data stream from the supplemental storage. If the entire missed portion of the selected program was outputted from the supplemental storage, yes output of step 714, then the selection logic switches output from the supplemental storage to the programming storage until the program finishes or until the viewer changes channels to view another program (step 716).

Subsequent to, or concurrent with, switching the output from the supplemental storage to the programming storage in step 716, the selection logic purges the stored data stream in the supplemental storage (step 718). Alternatively, the selection logic may mark the stored data stream in the supplemental storage as obsolete and overwrite the marked data stream as needed.

Afterward, the DVR makes a determination as to whether the DVR receives an input to power off (step 720). If the DVR does not receive an input to power off, no output of step 720, then the process returns to step 706 where the DVR continues to store the input data stream in the supplemental storage. If the DVR does receive an input to power off, yes output of step 720, then the DVR powers off (step 722). The process terminates thereafter.

Thus, illustrative embodiments provide a computer implemented method, system, and computer usable program code to enable that a program may be viewed in its entirety, even when a viewer tunes into the program after it started airing. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer recordable storage medium providing program code for use by or in connection with a computer or any instruction execution system. For the purposes of this description, a computer recordable storage medium may be any tangible apparatus that may store the program for use by or in connection with the instruction execution system, apparatus, or device.

The computer recordable storage medium may be an electronic, magnetic, optical, or semiconductor system (or apparatus or device). Examples of a computer recordable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enabling complete viewing of selected programming content stored on a digital video recorder, the method comprising the steps of:

the digital video recorder storing programming data within an input stream in a first storage device located in the digital video recorder as the digital video recorder receives the input stream from a programming service provider, wherein the programming data is for a plurality of programs being aired on a plurality of channels and comprises a first portion of a program of the plurality of programs being aired on a channel of the plurality of channels;

responsive to a user selecting to view the channel after the first portion of the program completed airing on the channel:

the digital video recorder storing additional programming data within the input stream in a second storage device located in the digital video recorder as the digital video recorder receives the input stream from the programming service provider, wherein the additional programming data comprises a remaining portion of the program; and the digital video recorder outputting the first portion of the program from the first storage device to a display device; and the digital video recorder determining that all of the first portion of the program was outputted from the first storage device to the display device, and in response, the digital video recorder outputting the remaining portion of the program from the second storage device to the display device and the digital video recorder purging the programming data from the first storage device.

2. The method of claim 1, wherein the programming service provider provides a provider side queuing service that temporarily stores beginning portions of user selected favorite channels in a storage unit provided by the programming service provider.

3. The method of claim 1, wherein the programming service provider is one of a cable television service provider, a satellite television service provider, an internet protocol television service provider, or a fiber optic service television service provider.

4. The method of claim 1, wherein the digital video recorder includes a selection logic, and wherein the selection logic is a software component that monitors and controls processes of the digital video recorder.

5. The method of claim 1, wherein the digital video recorder is a fiber optic service digital video recorder that includes an optical to digital converter, and wherein the optical to digital converter changes optical pulses directly into digital data.

6. The method of claim 1, further comprising the steps of:

the digital video recorder recording a playback of the first portion of the program from the first storage device onto the second storage device; and the digital video recorder merging the recorded playback with the remaining portion of the program to produce an entire recorded program on the second storage device available for future viewing.

7. A computer program product for enabling complete viewing of selected programming content stored on a digital video recorder, the computer program product comprising:

one or more computer-readable tangible storage devices;

program instructions, stored on at least one of the one or more computer-readable tangible storage devices, to store programming data within an input stream in a first storage device located in the digital video recorder as the digital video recorder receives the input stream from a programming service provider, wherein the programming data is for a plurality of programs being aired on a plurality of channels and comprises a first portion of a program of the plurality of programs being aired on a channel of the plurality of channels;

program instructions, stored on at least one of the one or more computer-readable tangible storage devices, responsive to a user selecting to view the channel after the first portion of the program completed airing on the channel:

to store additional programming data within the input stream in a second storage device located in the digital video recorder as the digital video recorder receives the input stream from the programming service provider, wherein the additional programming data comprises a remaining portion of the program; and to output the first portion of the program from the first storage device to a display device; and program instructions, stored on at least one of the one or more computer-readable tangible storage devices, to determine that all of the first portion of the program was outputted from the first storage device to the display device, and in response, to purge the programming data from the first storage device.

8. The computer program product of claim 7, wherein the programming service provider provides a provider side queuing service that temporarily stores beginning portions of user selected favorite channels in a storage unit provided by the programming service provider.

9. The computer program product of claim 7, wherein the programming service provider is one of a cable television service provider, a satellite television service provider, an internet protocol television service provider, or a fiber optic service television service provider.

10. The computer program product of claim 7, wherein the digital video recorder includes a selection logic, and wherein the selection logic is a software component that monitors and controls processes of the digital video recorder.

11. The computer program product of claim 7, wherein the digital video recorder is a fiber optic service digital video recorder that includes an optical to digital converter, and wherein the optical to digital converter changes optical pulses directly into digital data.

12. The computer program product of claim 7, further comprising:

program instructions, stored on at least one of the one or more computer-readable tangible storage devices, to record a playback of the first portion of the program from the first storage device onto the second storage device; and program instructions, stored on at least one of the one or more computer-readable tangible storage devices, to merge the recorded playback with the remaining portion of the program to produce an entire recorded program on the second storage device available for future viewing.

13. A digital video recorder for enabling complete viewing of selected programming content stored on the digital video recorder, the digital video recorder comprising:

one or more processors, one or more computer-readable memories, and one or more computer-readable tangible storage devices;

program instructions, stored on at least one of the one or more computer-readable tangible storage devices for execution by at least one of the one or more processors via at least one of the one or more computer-readable memories, to store programming data within an input stream in a first storage device located in the digital video recorder as the digital video recorder receives the input stream from a programming service provider, wherein the programming data is for a plurality of programs being aired on a plurality of channels and comprises a first portion of a program of the plurality of programs being aired on a channel of the plurality of channels;

program instructions, stored on at least one of the one or more computer-readable tangible storage devices for execution by at least one of the one or more processors via at least one of the one or more computer-readable memories, responsive to a user selecting to view the channel after the first portion of the program completed airing on the channel:

to store additional programming data within the input stream in a second storage device located in the digital video recorder as the digital video recorder receives the input stream from the programming service provider, wherein the additional programming data comprises a remaining portion of the program; and to output the first portion of the program from the first storage device to a display device; and program instructions, stored on at least one of the one or more computer-readable tangible storage devices for execution by at least one of the one or more processors via at least one of the one or more computer-readable memories, to determine that all of the first portion of the program was outputted from the first storage device to the display device, and in response, to output the remaining portion of the program from the second storage device to the display device and to purge the programming data from the first storage device.

14. The digital video recorder of claim 13, wherein the programming service provider provides a provider side queuing service that temporarily stores beginning portions of user selected favorite channels in a storage unit provided by the programming service provider.

15. The digital video recorder of claim 13, wherein the programming service provider is one of a cable television service provider, a satellite television service provider, an internet protocol television service provider, or a fiber optic service television service provider.

16. The digital video recorder of claim 13, wherein the digital video recorder includes a selection logic, and wherein the selection logic is a software component that monitors and controls processes of the digital video recorder.

17. The digital video recorder of claim 13, wherein the digital video recorder is a fiber optic service digital video recorder that includes an optical to digital converter, and wherein the optical to digital converter changes optical pulses directly into digital data.

18. The digital video recorder of claim 13, further comprising:

program instructions, stored on at least one of the one or more computer-readable tangible storage devices for execution by at least one of the one or more processors via at least one of the one or more computer-readable memories, to record a playback of the first portion of the program from the first storage device onto the second storage device; and program instructions, stored on at least one of the one or more computer-readable tangible storage devices for execution by at least one of the one or more processors via at least one of the one or more computer-readable memories, to merge the recorded playback with the remaining portion of the program to produce an entire recorded program on the second storage device available for future viewing.

* * * * *